United States Patent
Schneider et al.

(10) Patent No.: US 8,753,194 B2
(45) Date of Patent: Jun. 17, 2014

(54) ESCROW ACCOUNTS FOR USE IN DISTRIBUTING PAYOUTS WITH MINIMAL INTERRUPTION TO GAME PLAY

(75) Inventors: Richard Jay Schneider, Las Vegas, NV (US); Thomas O. Mikulich, Las Vegas, NV (US)

(73) Assignee: IGT, Las Vegas, NV (US)

( * ) Notice: Subject to any disclaimer, the term of this patent is extended or adjusted under 35 U.S.C. 154(b) by 208 days.

(21) Appl. No.: 12/944,261

(22) Filed: Nov. 11, 2010

(65) Prior Publication Data
US 2012/0122555 A1    May 17, 2012

(51) Int. Cl.
*A63F 9/24* (2006.01)
*G06F 17/00* (2006.01)

(52) U.S. Cl.
USPC .................................. 463/25; 463/29; 463/42

(58) Field of Classification Search
None
See application file for complete search history.

(56) References Cited

U.S. PATENT DOCUMENTS

| | | |
|---|---|---|
| 4,636,951 A | 1/1987 | Harlick |
| 4,679,143 A | 7/1987 | Hagiwara |
| 4,856,787 A | 8/1989 | Itkis |
| 4,991,848 A | 2/1991 | Greenwood et al. |
| 5,129,652 A | 7/1992 | Wilkinson |
| 5,179,517 A | 1/1993 | Sarbin et al. |
| 5,209,476 A | 5/1993 | Eiba |
| 5,229,764 A | 7/1993 | Matchett et al. |
| 5,244,207 A | 9/1993 | Laatikainen |
| 5,249,800 A | 10/1993 | Hilgendorf et al. |
| 5,265,874 A | 11/1993 | Dickinson et al. |
| 5,275,400 A | 1/1994 | Weingardt et al. |
| 5,277,424 A | 1/1994 | Wilms |
| 5,326,104 A | 7/1994 | Pease et al. |
| 5,344,144 A | 9/1994 | Canon |
| 5,370,399 A | 12/1994 | Liverance |
| 5,371,345 A | 12/1994 | LeStrange et al. |
| 5,377,973 A | 1/1995 | Jones et al. |
| 5,382,784 A | 1/1995 | Eberhardt |
| 5,429,361 A | 7/1995 | Raven et al. |
| 5,450,938 A | 9/1995 | Rademacher |
| 5,470,079 A | 11/1995 | LeStrange et al. |
| 5,505,461 A * | 4/1996 | Bell et al. .......................... 463/25 |
| 5,511,781 A | 4/1996 | Wood et al. |
| 5,528,248 A | 6/1996 | Steiner et al. |
| 5,557,086 A | 9/1996 | Schulze et al. |
| 5,559,312 A | 9/1996 | Lucero |

(Continued)

FOREIGN PATENT DOCUMENTS

| AU | 2002367741 | 9/2003 |
|---|---|---|
| EP | 0015081 | 9/1980 |

(Continued)

OTHER PUBLICATIONS

IRS Form W-2G and Instructions, 8 pages, (2008).*

*Primary Examiner* — Paul A D'Agostino
(74) *Attorney, Agent, or Firm* — Neal, Gerber & Eisenberg LLP (57) ABSTRACT

A gaming machine includes configured to communicate with a remote server, and further configured to detect a reportable event during play of a game by a player, wherein the reportable event is associated with a winning outcome having an associated award amount. The processor also receives an acknowledgement of the reportable event from the player, and transmits the acknowledgement of the reportable event and the award amount to the remote server for use in generating a taxable accrual log.

21 Claims, 7 Drawing Sheets

(56) References Cited

U.S. PATENT DOCUMENTS

| | | |
|---|---|---|
| 5,586,936 A | 12/1996 | Bennett et al. |
| 5,618,045 A | 4/1997 | Kagan et al. |
| 5,639,088 A | 6/1997 | Schneider et al. |
| 5,643,086 A | 7/1997 | Alcorn et al. |
| 5,655,961 A | 8/1997 | Acres et al. |
| 5,678,886 A | 10/1997 | Infanti |
| 5,738,583 A | 4/1998 | Comas et al. |
| 5,741,183 A | 4/1998 | Acres et al. |
| 5,759,102 A | 6/1998 | Pease et al. |
| 5,761,647 A | 6/1998 | Boushy |
| 5,768,382 A | 6/1998 | Schneier et al. |
| 5,770,533 A | 6/1998 | Franchi |
| 5,779,545 A | 7/1998 | Berg et al. |
| 5,779,546 A | 7/1998 | Meissner et al. |
| 5,779,549 A | 7/1998 | Walker et al. |
| 5,795,228 A | 8/1998 | Trumbull et al. |
| 5,797,085 A | 8/1998 | Beuk et al. |
| 5,816,917 A | 10/1998 | Kelmer et al. |
| 5,871,398 A | 2/1999 | Schneier et al. |
| 5,884,271 A | 3/1999 | Pitroda |
| 5,915,023 A | 6/1999 | Bernstein |
| 5,919,091 A | 7/1999 | Bell et al. |
| 5,967,896 A | 10/1999 | Jorasch et al. |
| 5,971,855 A | 10/1999 | Ng |
| 5,999,808 A | 12/1999 | LaDue |
| 6,001,016 A | 12/1999 | Walker et al. |
| 6,003,013 A | 12/1999 | Boushy et al. |
| 6,012,832 A | 1/2000 | Saunders et al. |
| 6,012,983 A | 1/2000 | Walker et al. |
| 6,016,479 A | 1/2000 | Taricani, Jr. |
| 6,019,283 A | 2/2000 | Lucero |
| 6,048,269 A | 4/2000 | Burns et al. |
| 6,093,100 A | 7/2000 | Singer et al. |
| 6,104,815 A | 8/2000 | Alcorn et al. |
| 6,106,396 A | 8/2000 | Alcorn et al. |
| 6,110,041 A | 8/2000 | Walker et al. |
| 6,117,013 A | 9/2000 | Eiba |
| 6,135,884 A | 10/2000 | Hedrick et al. |
| 6,142,876 A | 11/2000 | Cumbers |
| 6,149,522 A | 11/2000 | Alcorn et al. |
| 6,168,522 B1 | 1/2001 | Walker et al. |
| 6,173,955 B1 | 1/2001 | Perrie et al. |
| 6,178,510 B1 | 1/2001 | O'Connor et al. |
| 6,210,279 B1 | 4/2001 | Dickinson |
| 6,244,957 B1 | 6/2001 | Walker et al. |
| 6,253,119 B1 | 6/2001 | Dabrowski |
| 6,270,410 B1 | 8/2001 | DeMar et al. |
| 6,280,326 B1 | 8/2001 | Saunders |
| 6,285,868 B1 | 9/2001 | LaDue |
| 6,287,200 B1 | 9/2001 | Sharma |
| 6,308,953 B1 | 10/2001 | Nagano |
| 6,312,333 B1 * | 11/2001 | Acres ............................. 463/25 |
| 6,319,125 B1 | 11/2001 | Acres |
| 6,331,144 B1 | 12/2001 | Walker et al. |
| 6,336,857 B1 | 1/2002 | McBride |
| 6,340,331 B1 | 1/2002 | Saunders et al. |
| 6,343,988 B1 | 2/2002 | Walker et al. |
| 6,347,996 B1 | 2/2002 | Gilmore et al. |
| 6,361,437 B1 | 3/2002 | Walker et al. |
| 6,371,852 B1 | 4/2002 | Acres |
| 6,375,187 B1 | 4/2002 | Baerlocher |
| 6,379,248 B1 | 4/2002 | Jorasch et al. |
| 6,383,077 B1 | 5/2002 | Kweitko et al. |
| 6,431,983 B2 | 8/2002 | Acres |
| 6,454,651 B1 | 9/2002 | Yoseloff |
| 6,488,585 B1 | 12/2002 | Wells et al. |
| 6,494,785 B1 | 12/2002 | Gerrard et al. |
| 6,506,118 B1 | 1/2003 | Baerlocher et al. |
| 6,508,709 B1 | 1/2003 | Karmarkar |
| 6,508,710 B1 | 1/2003 | Paravia et al. |
| 6,511,377 B1 | 1/2003 | Weiss |
| 6,514,140 B1 | 2/2003 | Storch |
| 6,514,141 B1 | 2/2003 | Kaminkow et al. |
| 6,533,662 B2 | 3/2003 | Soltys et al. |
| 6,537,151 B1 | 3/2003 | Walker et al. |
| 6,549,912 B1 | 4/2003 | Chen |
| 6,554,707 B1 | 4/2003 | Sinclair et al. |
| 6,554,709 B1 | 4/2003 | Brenner et al. |
| 6,569,015 B1 | 5/2003 | Baerlocher et al. |
| 6,595,855 B2 | 7/2003 | Sako |
| 6,599,192 B1 | 7/2003 | Baerlocher et al. |
| 6,607,441 B1 | 8/2003 | Acres |
| 6,612,928 B1 | 9/2003 | Bradford et al. |
| 6,632,141 B2 | 10/2003 | Webb et al. |
| 6,645,068 B1 | 11/2003 | Kelly et al. |
| 6,648,754 B2 | 11/2003 | Baerlocher et al. |
| 6,676,522 B2 | 1/2004 | Rowe et al. |
| 6,679,775 B1 | 1/2004 | Luciano et al. |
| 6,681,984 B2 | 1/2004 | Brunner |
| 6,682,421 B1 | 1/2004 | Rowe et al. |
| 6,687,700 B1 | 2/2004 | Cornelius et al. |
| 6,692,355 B2 | 2/2004 | Baerlocher et al. |
| 6,702,672 B1 | 3/2004 | Angell et al. |
| 6,712,698 B2 | 3/2004 | Paulsen et al. |
| 6,716,103 B1 | 4/2004 | Eck et al. |
| 6,719,632 B2 | 4/2004 | Palmer et al. |
| 6,722,981 B2 | 4/2004 | Kaminkow et al. |
| 6,722,982 B2 | 4/2004 | Kaminkow et al. |
| 6,722,985 B2 | 4/2004 | Criss-Puszkiewicz et al. |
| 6,729,957 B2 | 5/2004 | Burns et al. |
| 6,732,195 B1 | 5/2004 | Baldwin |
| 6,743,097 B2 | 6/2004 | Walker et al. |
| 6,758,393 B1 | 7/2004 | Luciano et al. |
| 6,758,750 B2 | 7/2004 | Baerlocher et al. |
| 6,761,637 B2 | 7/2004 | Weston et al. |
| 6,786,820 B2 | 9/2004 | Gerrard et al. |
| 6,793,579 B2 | 9/2004 | Baerlocher et al. |
| 6,796,905 B2 | 9/2004 | Baerlocher et al. |
| 6,800,029 B2 | 10/2004 | Rowe et al. |
| 6,805,634 B1 | 10/2004 | Wells et al. |
| 6,808,452 B2 | 10/2004 | Baerlocher et al. |
| 6,808,454 B2 | 10/2004 | Gerrard et al. |
| 6,811,483 B1 | 11/2004 | Webb et al. |
| 6,846,238 B2 | 1/2005 | Wells |
| 6,852,030 B2 | 2/2005 | Baerlocher et al. |
| 6,852,031 B1 | 2/2005 | Rowe |
| 6,857,961 B2 | 2/2005 | Soltys et al. |
| 6,890,257 B2 | 5/2005 | Baerlocher |
| 6,892,938 B2 * | 5/2005 | Solomon ....................... 235/375 |
| 6,899,623 B2 | 5/2005 | Baerlocher |
| 6,935,958 B2 | 8/2005 | Nelson |
| 6,942,566 B2 | 9/2005 | Baerlocher et al. |
| 6,942,567 B2 | 9/2005 | Baerlocher et al. |
| 6,960,132 B2 | 11/2005 | Baerlocher et al. |
| 6,966,833 B2 | 11/2005 | Kaminkow et al. |
| 6,971,953 B2 | 12/2005 | Gerrard et al. |
| 6,971,956 B2 | 12/2005 | Rowe et al. |
| 6,984,175 B2 * | 1/2006 | Nguyen et al. .................. 463/25 |
| 6,991,544 B2 | 1/2006 | Soltys et al. |
| 7,001,273 B2 | 2/2006 | Baerlocher |
| 7,004,466 B2 | 2/2006 | Gauselmann |
| 7,025,674 B2 | 4/2006 | Adams et al. |
| 7,040,984 B2 | 5/2006 | Mead |
| 7,160,186 B2 | 1/2007 | Cuddy et al. |
| 7,192,349 B2 | 3/2007 | Baerlocher et al. |
| 7,235,010 B2 | 6/2007 | Baerlocher |
| 7,250,001 B2 | 7/2007 | Baerlocher et al. |
| 7,260,834 B1 | 8/2007 | Carlson |
| 7,264,545 B2 | 9/2007 | Maya et al. |
| 7,270,604 B2 | 9/2007 | Gerrard et al. |
| 7,350,696 B2 | 4/2008 | Frerking |
| 7,758,417 B2 | 7/2010 | Jorasch et al. |
| 7,867,081 B2 | 1/2011 | Schneider et al. |
| 7,963,842 B2 | 6/2011 | Ruymann |
| 8,210,931 B2 * | 7/2012 | Alderucci et al. .............. 463/25 |
| 2001/0044337 A1 | 11/2001 | Rowe et al. |
| 2001/0051540 A1 | 12/2001 | Hindman et al. |
| 2002/0032049 A1 | 3/2002 | Walker et al. |
| 2002/0142846 A1 | 10/2002 | Paulsen |
| 2002/0147040 A1 | 10/2002 | Walker et al. |
| 2002/0152120 A1 | 10/2002 | Howington |
| 2003/0003997 A1 | 1/2003 | Vuong et al. |
| 2003/0013521 A1 * | 1/2003 | Cole et al. ....................... 463/29 |
| 2003/0040360 A1 | 2/2003 | Kaminkow |

(56) References Cited

U.S. PATENT DOCUMENTS

| | | |
|---|---|---|
| 2003/0045353 A1 | 3/2003 | Paulsen et al. |
| 2003/0045354 A1 | 3/2003 | Giobbi |
| 2003/0073494 A1 | 4/2003 | Kalpakian et al. |
| 2003/0078093 A1 | 4/2003 | Simms et al. |
| 2003/0083126 A1* | 5/2003 | Paulsen ............ 463/25 |
| 2003/0087652 A1 | 5/2003 | Simon et al. |
| 2003/0104862 A1 | 6/2003 | Acres |
| 2003/0148812 A1 | 8/2003 | Paulsen et al. |
| 2003/0162584 A1 | 8/2003 | Hughs-Baird et al. |
| 2003/0162588 A1 | 8/2003 | Brosnan et al. |
| 2003/0162589 A1* | 8/2003 | Nguyen et al. ............ 463/25 |
| 2003/0186739 A1 | 10/2003 | Paulsen et al. |
| 2003/0195036 A1* | 10/2003 | Poole et al. ............ 463/25 |
| 2003/0199312 A1 | 10/2003 | Walker et al. |
| 2003/0216169 A1 | 11/2003 | Walker et al. |
| 2003/0224854 A1 | 12/2003 | Joao |
| 2003/0228907 A1 | 12/2003 | Gatto et al. |
| 2004/0002386 A1 | 1/2004 | Wolfe et al. |
| 2004/0010556 A1 | 1/2004 | Kawakita et al. |
| 2004/0014518 A1 | 1/2004 | Iwamoto |
| 2004/0048667 A1 | 3/2004 | Rowe |
| 2004/0092307 A1 | 5/2004 | George et al. |
| 2004/0106444 A1 | 6/2004 | Cuddy et al. |
| 2004/0110554 A1 | 6/2004 | Bromfield |
| 2004/0162128 A1 | 8/2004 | Baerlocher et al. |
| 2004/0204244 A1 | 10/2004 | Rathsack et al. |
| 2004/0209690 A1 | 10/2004 | Bruzzese et al. |
| 2005/0003887 A1 | 1/2005 | Seelig |
| 2005/0009599 A1* | 1/2005 | Ryan ............ 463/29 |
| 2005/0009600 A1 | 1/2005 | Rowe et al. |
| 2005/0020342 A1 | 1/2005 | Palmer et al. |
| 2005/0043086 A1* | 2/2005 | Schneider ............ 463/25 |
| 2005/0054413 A1 | 3/2005 | Randall et al. |
| 2005/0054438 A1 | 3/2005 | Rothschild et al. |
| 2005/0090304 A1 | 4/2005 | Crawford et al. |
| 2005/0130729 A1 | 6/2005 | Baerlocher et al. |
| 2005/0143171 A1* | 6/2005 | Loose ............ 463/29 |
| 2005/0153771 A1* | 7/2005 | Ghela ............ 463/17 |
| 2005/0170884 A1 | 8/2005 | Okada |
| 2005/0170885 A1* | 8/2005 | Poole et al. ............ 463/25 |
| 2005/0215306 A1* | 9/2005 | O'Donnell et al. ............ 463/17 |
| 2005/0227760 A1 | 10/2005 | Vlazny et al. |
| 2006/0033280 A1* | 2/2006 | Viarrial, Jr. ............ 273/292 |
| 2006/0068904 A1 | 3/2006 | Nguyen et al. |
| 2006/0154722 A1 | 7/2006 | Walker et al. |
| 2006/0172791 A1 | 8/2006 | Wolf |
| 2007/0004510 A1 | 1/2007 | Underdahl et al. |
| 2007/0015587 A1* | 1/2007 | Glisson et al. ............ 463/42 |
| 2007/0054728 A1 | 3/2007 | Hood |
| 2007/0060311 A1 | 3/2007 | Rowe et al. |
| 2007/0060394 A1 | 3/2007 | Gowin et al. |
| 2007/0087834 A1 | 4/2007 | Moser et al. |
| 2007/0099696 A1* | 5/2007 | Nguyen et al. ............ 463/25 |
| 2007/0117623 A1 | 5/2007 | Nelson et al. |
| 2007/0135206 A1 | 6/2007 | Inamura |
| 2008/0188308 A1 | 8/2008 | Rowe et al. |
| 2008/0200253 A1* | 8/2008 | Van Luchene et al. ......... 463/42 |
| 2009/0124373 A1* | 5/2009 | Acres ............ 463/29 |
| 2009/0270175 A1* | 10/2009 | Kelly et al. ............ 463/42 |
| 2009/0312093 A1* | 12/2009 | Walker et al. ............ 463/25 |
| 2010/0240448 A1* | 9/2010 | Keenan et al. ............ 463/27 |

FOREIGN PATENT DOCUMENTS

| | | |
|---|---|---|
| EP | 1004970 | 5/2000 |
| EP | 1481342 | 12/2004 |
| EP | 1544813 | 6/2005 |
| GB | 2 161 008 | 1/1986 |
| WO | WO 85/00910 | 2/1985 |
| WO | WO/95/24689 | 4/1995 |
| WO | WO/96/12262 | 4/1996 |
| WO | WO/96/00950 | 11/1996 |
| WO | WO/98/30297 | 7/1998 |
| WO | WO/99/22350 | 5/1999 |
| WO | WO/01/25992 | 4/2001 |
| WO | WO/01/54091 | 7/2001 |
| WO | WO/01/76710 | 10/2001 |
| WO | WO/01/91075 | 11/2001 |
| WO | WO/01/91866 | 12/2001 |
| WO | WO/02/17251 | 2/2002 |
| WO | WO/02/21370 | 3/2002 |
| WO | WO/02/058020 | 7/2002 |
| WO | WO/03/063019 | 7/2003 |
| WO | WO/03/075203 | 9/2003 |
| WO | WO/03/084625 | 10/2003 |
| WO | WO/2004/024268 | 3/2004 |
| WO | WO/2004/090818 | 10/2004 |
| WO | WO/2006/010011 | 1/2006 |

* cited by examiner

ESCROW ACCOUNTS FOR USE IN DISTRIBUTING PAYOUTS WITH MINIMAL INTERRUPTION TO GAME PLAY

BACKGROUND OF THE INVENTION

The embodiments described herein relate generally to gaming activities and, more particularly, to using a jackpot escrow account to minimize a number of interruptions to game play due to reportable events.

At least some known gaming systems enable players to make large wagers that may frequently result in winning outcomes having awards that exceed an amount requiring tax forms to be completed and filed with the appropriate local, state, and federal agencies. For example, a player that wins more than $1,199, i.e., a threshold amount, is required to report his winnings to at least the United States Internal Revenue Service in the form of a W-2G Gambling Winnings tax form. In at least some known gaming establishments, the required information, including the player's name, home address, social security number, and the like, as well as some form of personal identification, such as a driver's license or player tracking card is obtained manually. Such known gaming establishments then manually enter the data into the W-2G form and any other required form using the information received, as well as any other required gaming information, such as the amount won. Although the threshold amount has remained static, the amounts of wagers by players, especially high-stakes players, have increased dramatically. Larger wagers generally result in more frequent and intrusive interruptions to game play. Such interruptions may be annoying or disruptive to players. Moreover, gaming establishments must dedicate personnel to observing game play and to filling in the required forms. The additional personnel and their associated training, adds considerable cost to the maintenance of high-stakes rooms, and if players find the continual observance and manual information gathering annoying, such annoyances may result in a loss of potential gaming revenue for gaming establishments.

Accordingly, at least some known gaming systems have attempted to automatically generate the required tax forms. However, even those gaming systems require frequent interruptions to game play to collect player data and to obtain the player's signature or electronic signature. In some instances, such known gaming systems merely generate new forms for each reportable event detected during game play, rather than generating a cumulative form at the end of a gaming session that reports accrued winnings during the gaming session. Moreover, known gaming systems do not allow separate player accounts to be used as non-cashable credits during a gaming session and/or to be converted to cashable credits to reconcile with the gaming establishment at the end of a gaming session, while generating only a single form or set or forms.

BRIEF DESCRIPTION OF THE INVENTION

Embodiments of the invention enable payout distribution while minimizing interruptions to on-going game play on electronic gaming machines using a slot jackpot escrow account. Such an escrow account "collects" or "aggregates" the award amounts from any winning outcome that exceeds a threshold amount established by local, state, and/or federal tax codes. Moreover, such an escrow account maintains these awards amounts separately from base game credits that can be received by the player as cash. The credits stored in the escrow account may be made available to the player when the base game credits are depleted, or may be reconciled with a gaming establishment at the end of a gaming session, at which time appropriate tax forms will be completed and filed with appropriate agencies. Some embodiments present verbiage to a player to explain that acknowledging a jackpot is the equivalent of signing a W-2G form for the jackpot amount. The player may then continue with automatic generation of appropriate forms as described herein, or may decline or opt out of the acknowledgement.

In one aspect, a gaming machine includes a processor that is configured to communicate with a remote server. The processor is also configured to detect a reportable event during play of a game by a player, wherein the reportable event is associated with a winning outcome having an associated award amount. The processor is further configured to receive an acknowledgement of the reportable event from the player, and to transmit the acknowledgement of the reportable event and the award amount to the remote server for use in generating a taxable accrual log.

In another aspect, a method includes detecting a winning outcome during play of a game by a player at a gaming machine, determining whether the winning outcome is a reportable event based on an award amount associated with the winning outcome, receiving an acknowledgement from the player of the reportable event, and transmitting the amount won to a remote server for use in electronically generating a taxable accrual log. In some embodiments, the log is stored locally on the gaming machine during a play session by the player and is then transmitted to the remote server for storage and/or aggregation with logs from across the casino.

In another aspect, a gaming system includes a gaming machine configured to enable play of a game by a player, and a server coupled to the gaming machine via a network. The server is configured to detect a winning outcome during play of the game, determine whether the winning outcome is a reportable event, and receive a payment method selection by the player from the gaming machine, wherein the payment method selection is one of an electronic payment option and a manual payment option. When the payment method selection is the electronic payment option, the server records a first portion of an award amount of the winning outcome in a player account associated with the player or in a credit meter of the gaming machine, and records a second portion of the award amount in the player account, wherein the first portion includes cashable credits that are worth less than a threshold amount that defines the reportable event and the second portion is comprised of non-cashable credits. In some embodiments, the non-cashable credits are stored in a non-cashable credit meter of the gaming machine. Alternatively, the non-cashable credits may be stored in a separate player account that is dedicated to non-cashable credits such that the non-cashable credits can be transferred to a gaming machine during game play.

DETAILED DESCRIPTION OF THE INVENTION

The embodiments described herein enable a gaming establishment to provide a more fluid and enjoyable gaming experience to a player, such as a high-stakes player, by eliminating the need for completion of one or more tax forms with each qualifying wining outcome. Moreover, during the player's gaming session, player accounting is simplified by enabling the player to reconcile his winnings at the end of the gaming session in a single transaction that includes completing a single tax form and/or loss statement, rather than multiple forms generated at each qualifying win. The embodiments described herein also enable the gaming establishment to provide the player with an on-site wagering account that "stores" the winnings for use in subsequent gaming sessions, thus increasing a likelihood that the player will return to the gaming establishment.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
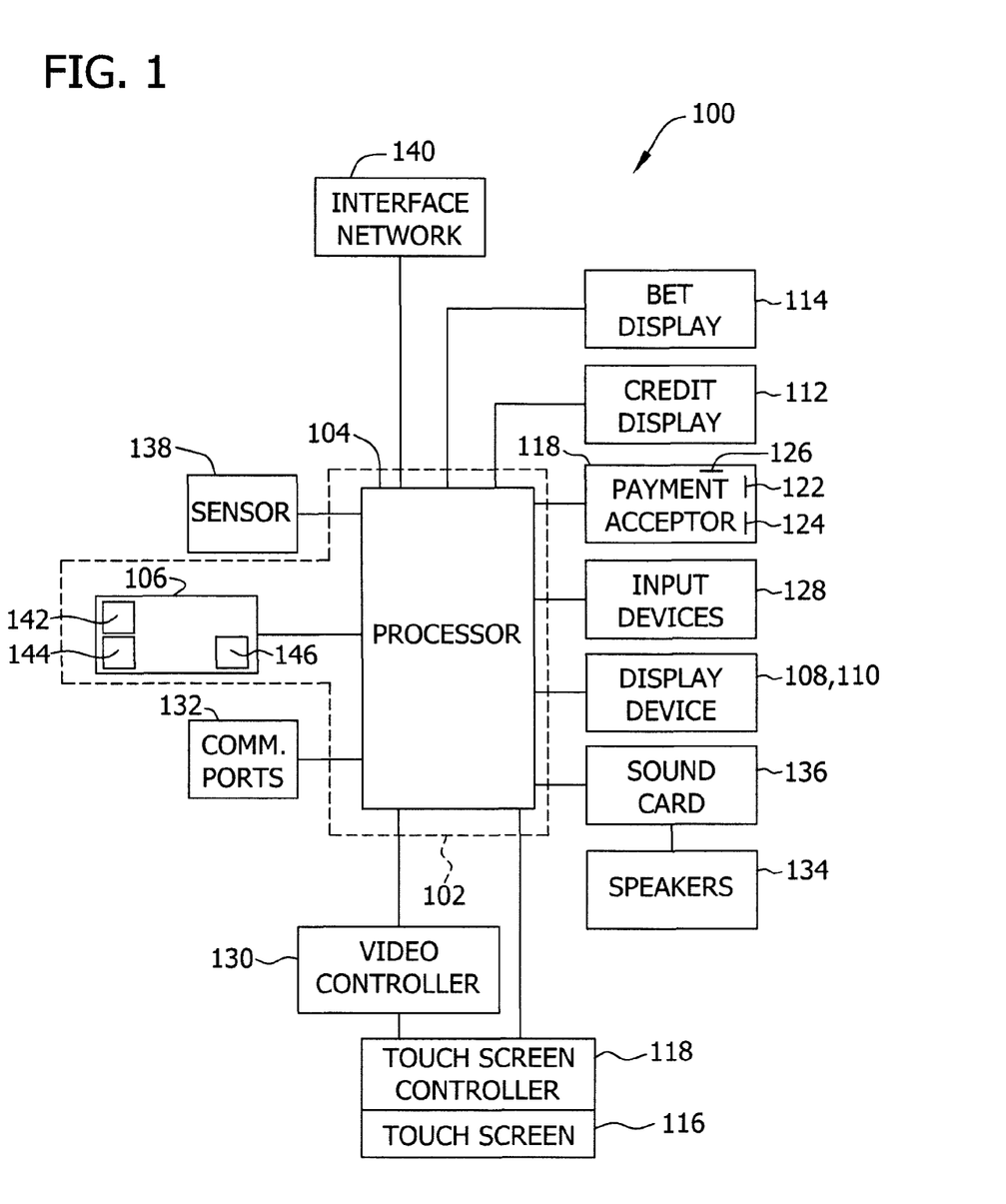
FIG. 1 is a schematic block diagram of an exemplary gaming machine.

FIG. 1 is a schematic block diagram of an exemplary gaming machine 100. In the exemplary embodiment, gaming machine 100 includes a gaming machine controller 102 having at least one processor 104, such as a microprocessor, a microcontroller-based platform, a suitable integrated circuit or one or more application-specific integrated circuits (ASICs). Processor 104 is communicably coupled with, or is operable to access or to exchange signals with, at least one data storage or memory area 106. In one embodiment, processor 104 and memory area 106 reside within a cabinet (not shown in FIG. 1) of gaming machine 100. Processor 104 and memory area 106 may be collectively referred to herein as a "computer" or "controller."

Memory area 106 stores program code and instructions, executable by processor 104, to control gaming machine 100. Memory area 106 also stores other data such as image data, event data, player input data, random or pseudo-random number generators, pay-table data or information and applicable game rules that relate to the play of gaming machine 100. Memory area 106 may include one, or more than one, forms of memory. For example, memory area 106 can include random access memory (RAM), which can include non-volatile RAM (NVRAM), magnetic RAM (MRAM), ferroelectric RAM (FeRAM) and other forms of memory. Memory area 106 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 106. Memory area 106 may also be, or include, a detachable or removable memory, including, but not limited to, a suitable cartridge, disk, CD ROM, DVD or USB memory.

In one embodiment, as described in more detail below, gaming machine 100 randomly generates awards and/or other game outcomes based on probability data. That is, each award or other game outcome is associated with a probability and gaming machine 100 generates the award or other game outcome to be provided to the player based on the associated probabilities. In this embodiment, because gaming machine 100 generates outcomes randomly or based upon a probability calculation, there is no certainty that gaming machine 100 will ever provide the player with any specific award or other game outcome. Such random determination could be provided through utilization of a random number generator (RNG), such as a true random number generator, a pseudo random number generator or other suitable randomization process.

In another embodiment, gaming machine 100 employs a predetermined or finite set or pool of awards or other game outcomes. In this embodiment, as each award or other game outcome is provided to the player, gaming machine 100 removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. Alternatively, gaming machine 100 enables play of skill-based games or presents play of a game that includes non-finite set or pool of outcomes, such as bingo. The outcomes displayed may be locally-determined or centrally-determined at a server.

In the exemplary embodiment, gaming machine 100 includes one or more display devices 108, 110 controlled by controller 102. Display devices 108 and 110 are mounted to a cabinet (not shown) of gaming machine 100. Gaming machine 100 includes a central display device 108, which displays a primary game. Display device 108 may also display any secondary game associated with the primary game as well as information relating to the primary or secondary game. Display device 110 may, for example, be an upper display device 110. Upper display device 110 may display the primary game, any suitable secondary game associated with the primary game and/or information relating to the primary or secondary game. At least one display device 108 and 110 may be a mobile display device, such as a PDA or tablet PC that enables play of at least a portion of the primary or secondary game at a location remote from other components of gaming machine 100.

Gaming machine 100 includes a credit display 112, which displays a player's current number of credits, cash, account balance or the equivalent. Credit display 112 may be separated into a cashable credit portion and a non-cashable credit portion (neither shown). Cashable credits can be converted into cash when the player chooses to "cash out." Non-cashable credits cannot be converted into cash, but rather, can only be used by the patron to activate play at gaming machine 100. Gaming machine 100 also includes a bet display 114 which displays a player's amount wagered. Credit display 112 and bet display 114 may be standalone displays independent of display devices 108 and 110, or credit display 112 and bet display 114 may be incorporated into display devices 108 and/or 110.

Display devices 108 and/or 110 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, described in more detail below, display devices 108 and/or 110 includes a touch-screen 116 with an associated touch-screen controller 118. Display devices 108 and/or 110 may be of any suitable configuration, such as a square, a rectangle or an elongated rectangle. Touch-screen 116 is coupled with touch-screen controller 118, or some other touch-sensitive display overlay to enable player interaction with the images on display devices 108 and/or 110.

Display devices 108 and/or 110 are configured to display one or more game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like. In one alternative embodiment, the symbols, images and indicia displayed on display devices 108 and/or 110 are in mechanical form. That is, display devices 108 and/or 110 may include any electromechanical device, such as one or more mechanical objects, such as one or more rotatable wheels, reels or dice, configured to display at least one and preferably a plurality of game or other suitable images, symbols or indicia.

Still referring to FIG. 1, gaming machine 100 includes at least one payment acceptor 120 that communicates with controller 102. Payment acceptor 120 includes a coin slot 122 and a payment, note or bill acceptor 124, that enables a player to insert money, coins, or tokens. Devices, such as a card reader or validator 126 for credit cards, debit cards, or credit slips, may be used to accept payment. An identification card and/or a smart card having a programmed microchip or a magnetic strip coded with a player's identification, credit totals and other relevant information may be used. In one embodiment, money may be transferred to a gaming machine through electronic funds transfer (EFT). When a player funds gaming machine 100, controller 102 determines the amount of funds entered and displays the corresponding amount on credit display 112, as described above.

Gaming machine 100 also includes one or more input devices 128 that are communicatively coupled to controller 102. Input devices 128 include any suitable device that enables the player to produce an input signal that is readable by controller 102. In one embodiment, input device 128 is a game activation device, such as a pull arm or a play button, which is used by the player to start any primary game or sequence of events in gaming machine 100. The play button can be any suitable play activator. In one embodiment, upon appropriate funding, gaming machine 100 begins the game play automatically. In another embodiment, upon the player engaging one of the play buttons, gaming machine 100 automatically activates game play. One input device 128 may be a "Bet One" button. The player places a bet by pushing the Bet One button. The player can increase the bet by one credit each time the player pushes the Bet One button. When the player pushes the Bet One button, the number of credits shown in credit display 112 decrements by one, and the number of credits shown in bet display 114 increments by one. Another input device may be a "Bet Max" button that enables the player to bet the maximum wager permitted for a game of gaming machine 100. Yet another input device 128 may be a "Cash Out" button. The player may push the Cash Out button to receive a cash payment or other suitable form of payment corresponding to the number of remaining credits. When the player cashes out, the player receives the coins or tokens in a coin payout tray (not shown in FIG. 1) or receives other payout mechanisms, such as tickets or credit slips, that are redeemable by a cashier, or funding to the player's electronically recordable identification card.

Touch-screen 116 and touch-screen controller 118 are communicatively coupled to a video controller 130. A player can make decisions and input signals into gaming machine 100 by touching touch-screen 116 at appropriate locations. Gaming machine 100 also includes one or more communication ports 132 that enable communication of controller 102 with external peripherals (not shown in FIG. 1), such as, but not limited to, external video sources, expansion buses, game or other displays, a SCSI port or a key pad.

In the exemplary embodiment, gaming machine 100 includes a sound generating device 134 that is controlled by one or more sounds cards 136, that function in conjunction with controller 102. Sound generating device 134 includes at least one speaker or other sound generating hardware and/or software for generating sounds, such as playing music for the primary and/or secondary game or for other modes of gaming machine 100, such as an attract mode. Gaming machine 100 provides dynamic sounds, coupled with attractive multimedia images displayed on one or more of display devices 108 and/or 110, to provide an audio-visual representation or to otherwise display full-motion video with sound to attract players to gaming machine 100. During idle periods, gaming machine 100 may display a sequence of audio and/or visual attraction messages to attract potential players to gaming machine 100. The videos may also be customized for or to provide any appropriate information.

In the exemplary embodiment, gaming machine 100 includes a sensor 138, such as a camera, that is communicatively coupled to, and/or controlled by, controller 102. Sensor 138 is selectively positionable to acquire an image of a player actively using gaming machine 100 and/or an area surrounding gaming machine 100. In one embodiment, the camera may selectively acquire still or moving (e.g., video) images and may acquire the images in either an analog, digital or other suitable format. Display devices 108 and/or 110 may display the image acquired by the camera, as well as display the visible manifestation of the game in split screen or picture-in-picture fashion. For example, the camera may acquire an image of the player and the processor may incorporate that image into the primary and/or secondary game as a game image, symbol or indicia. Furthermore, gaming machine 100 is capable of communicatively coupling to a network (not shown in FIG. 1) via a network interface 140.

Gaming machine 100 can incorporate any suitable wagering primary or base game. Moreover, gaming machine 100 may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In some embodiments, memory area 106 includes one or more computer-readable storage media having computer-executable components. An exemplary component is a display component 142 that controls, for example, video controller 130 and/or display devices 108 and 110. For example, display component 142 controls display of a first video image that represents a game and display of a second video image that represents a media display. Another exemplary component is a detection component 144 that detects when the second video image obscures a critical component or a threshold percentage of the first video image. Yet another exemplary component is a security component 146 that selectively enables and disables display of the second video image, as described in greater detail below.

Figure 2:
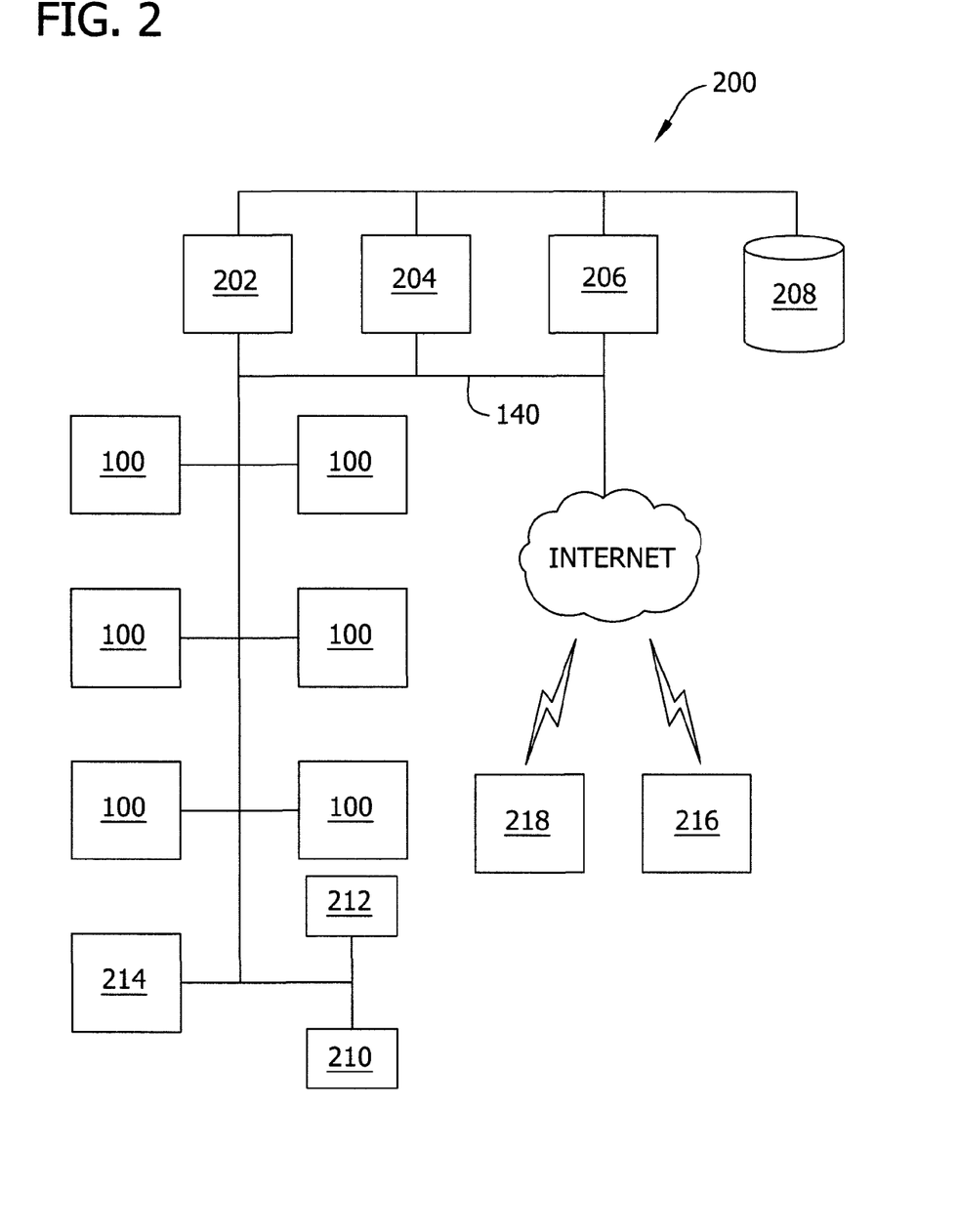
FIG. 2 is a block schematic diagram of an exemplary gaming system that includes a plurality of the gaming machine shown in FIG. 1.

FIG. 2 is a block schematic diagram of an exemplary gaming system 200 that includes a plurality of gaming machines 100. Each gaming machine 100 is coupled via a network connection 140 to one or more servers, such as a game server 202, an accounting server 204, and a player tracking server 206. Each server 202, 204, and 206 includes a processor (not shown) that facilitates data communication between each gaming machine 100 and other components of gaming system 200. Such data is stored in, for example, a memory area 208, such as a database, that is coupled to each server 202, 204, and 206. Moreover, one or more servers 202, 204, and/or 206 include audio capabilities, such as a CD-ROM drive (not shown) or DVD-ROM drive (not shown), that are coupled to a sound card (not shown) for processing and transmitting digitized sound effects to one or more speakers 210 for presentation to players or other casino patrons. Each server 202, 204, and 206 is also coupled via gaming system 200 to an electronic sign or screen 212 that displays information, such as via scrolling and/or flashing messages that indicate, for example, progressive and/or jackpot amounts, and that are visible to players playing gaming machines 100. Messages for display on each electronic screen 212 are generated and/or modified in response to commands issued over gaming system 200 by servers 202, 204, and/or 206.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a server, such as servers 202, 204, and/or 206. In such an embodiment, gaming machine 100 displays results of the game via display devices 108 and/or 110 (shown in FIG. 1).

Moreover, in the exemplary embodiment, gaming system 200 includes a configuration workstation 214 that includes a user interface that enables an administrator to set up and/or to modify portions of gaming system 200 and/or servers 202, 204, and 206. Game server 202 controls bonus applications or bonus systems that award bonus opportunities on gaming system 200. Moreover, game server 202 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

Player tracking server 206 tracks data of players using gaming machines 100, and also controls messages that appear on each display device 108 and/or 110 of gaming machines 100. In the exemplary embodiment, player tracking server 206 also stores physical characteristics of players, such as, but not limited to, the player age. Player tracking server 206 also stores data related to the players and tracked using player tracking identification, such as a player card. Moreover, player tracking server 206 stores information and data about the player such as loyalty points, player address, phone number, and/or any information that may be retrieved and transmitted to the game server 202. Accounting server 204 stores and tracks information such as, but not limited to, the average amount of wager played at gaming machine 100. Moreover, accounting server 204 tracks an average amount of wagers by the player, any funds the player may have in an account, and data relating to reportable events. Such data is associated with individual players and logged using a taxable accrual log.

Furthermore, in the exemplary embodiment, gaming system 200 includes one or more remote computers 216 and/or mobile devices 218 that access system 200 via an external network, such as the Internet.

Figure 3:
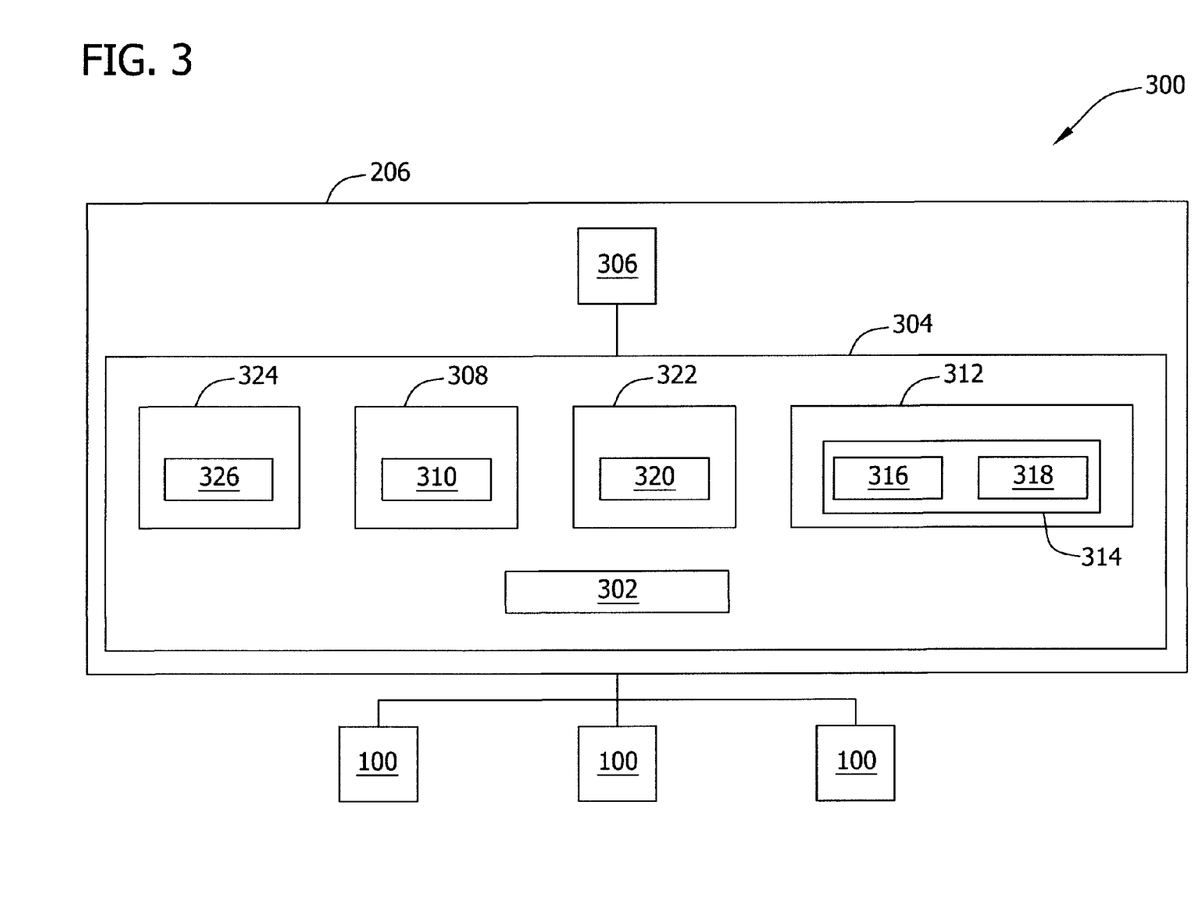
FIG. 3 is a functional diagram of an accounting server used with the gaming system shown in FIG. 2.

FIG. 3 is a functional diagram 300 of accounting server 204. In the exemplary embodiment, accounting server 204 includes an administration module 302 that communicates with gaming machine 100 (shown in FIG. 1). Administration module 302 monitors gaming machine 100 that identifies winning outcomes having award amounts that exceed a threshold amount that is defined by a reportable event. Alternatively, administration module 302 may receive a notification from gaming machine 100 that award amounts exceed the threshold amount. Administration module 302 also stores gaming and player data associated with reportable events, automatically completes forms required for reportable events. In some embodiments, administration module 302 automatically files the forms with appropriate agencies, such as federal governmental agencies and/or state governmental agencies. Alternatively, administration module 302 executes, such as periodically executes, a routine that accumulates all W-2G forms generated by the casino during a specified time period. In such an embodiment, administration module 302 creates one or more files in formats specified by the federal governmental agencies and/or state governmental agencies and sends or transmits the files to the appropriate federal governmental agencies and/or state governmental agencies.

In the exemplary embodiment, administration module 302 is stored on a memory area 304 for execution by a processor 306. Memory area 304 may include one, or more than one, forms of memory. For example, memory area 304 can include random access memory (RAM), which can include non-volatile RAM (NVRAM), magnetic RAM (MRAM), ferroelectric RAM (FeRAM) and other forms of memory. Memory area 304 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 304. Memory area 304 may also be, or include, a detachable or removable memory, including, but not limited to, a suitable cartridge, disk, CD ROM, DVD or USB memory. In addition to administration module 302, memory area 304 stores a blank form database 308 that includes blank forms 310 that are necessary for payout of award amounts that exceed the threshold amount. Each form 310 is stored in an electronic format that enables accounting server 206 to complete them electronically. Forms 310 may include, but are not limited to only including, those that are necessary to satisfy requirements of agencies of a particular jurisdiction, such as federal W-2G forms, W-9 forms, media release forms, primary jackpot report forms, primary jackpot hit report forms, questionnaires, lump sum/annuity forms, and/or state and local regulatory forms.

Memory area 304 also stores a jackpot record database 312 that includes records 314 of large award amounts that require forms 310 to be filled out. Each jackpot record 314 typically includes player data 316 and gaming data 318. Player data 316 includes, for example, name, address, phone number, email address, Social Security Number, a unique player identifier, personal identification number (PIN), and/or a flag that indicates whether a player has consented to use a jackpot escrow account such as those described herein. In one embodiment, player data 316 is not stored in jackpot record database 312 but, rather, is read or retrieved from player tracking server 206 (shown in FIG. 2). In such an embodiment, player data 316 includes only, for example, a unique player identifier which links data stored in jackpot record database 312 to data stored in player tracking server 206. In the exemplary embodiment, gaming data 318 includes, for example, a numeric value of a jackpot payout, a venue identifier such as a tax identifier, a gaming machine identifier, the date and time of a jackpot payout, and any other necessary gaming data that is required by gaming regulations.

Moreover, in the exemplary embodiment, administration module 302 retrieves the next record 314 from a queued list stored in jackpot record database 312. Based on player data 316 and gaming data 318 of the next record 314, administration module 302 determines the appropriate forms 310 from blank form database 308. In some embodiments, when the appropriate form 310 is not stored in blank form database 308, administration module 302 attempts to download the appropriate form 310 from the appropriate agency. In the exemplary embodiment, administration module 302 completes the appropriate forms 310 using player data 316 and gaming data 318. For example, administration module 302 reads the player name, address, social security number, and the like from player data 316 and populates the appropriate fields in forms 310 with the data. Similarly, administration module 302 identifies the jackpot amount, for example, from gaming data 318 and inserts this value into the appropriate field in forms 310. Moreover, administration module 302 performs calculations that are required to fill in forms 310, such as calculating a withhold value. When forms 310 are complete, a copy of each completed form 320 is stored in a completed form database 322. Furthermore, in the exemplary embodiment, player data 316 includes a taxable accrual log that lists any amounts won by a player during game play that trigger a reportable event, the withholding from each winning amount, if any, and a signature of the player that represents the player's authorization of the withholding. As described below, in the exemplary embodiment the signature is an electronic signature.

In the exemplary embodiment, memory area 304 also stores a player account database 324 that includes player account data 326. Player account data 326 includes, for example, a unique identifier of a player that links player account database 324 to player data 316 and/or to player tracking server 206. Moreover, player account data 326 includes a number of credits owned by a player including, for example, cashable credits and non-cashable credits. Cashable credits can be converted into cash when the player chooses to "cash out," and non-cashable credits cannot be converted into cash and can only be used by the patron to activate play at gaming machine 100 (shown in FIG. 1). However, any credits won by the player as a result of a wager of non-cashable credits, are stored as cashable credits. Moreover, in the exemplary embodiment, player account data 326 includes data relating to escrow credits. When a player obtains a winning outcome during play of gaming machine 100, and when the winning outcome includes an award that triggers a reportable event, administration module 302 can separate the award into a first portion that includes cashable credits, and a second portion that includes non-cashable credits. In each embodiment, the first portion is less than a threshold amount that defines the reportable event, and the second portion is the remaining amount of the award.

Figure 4:
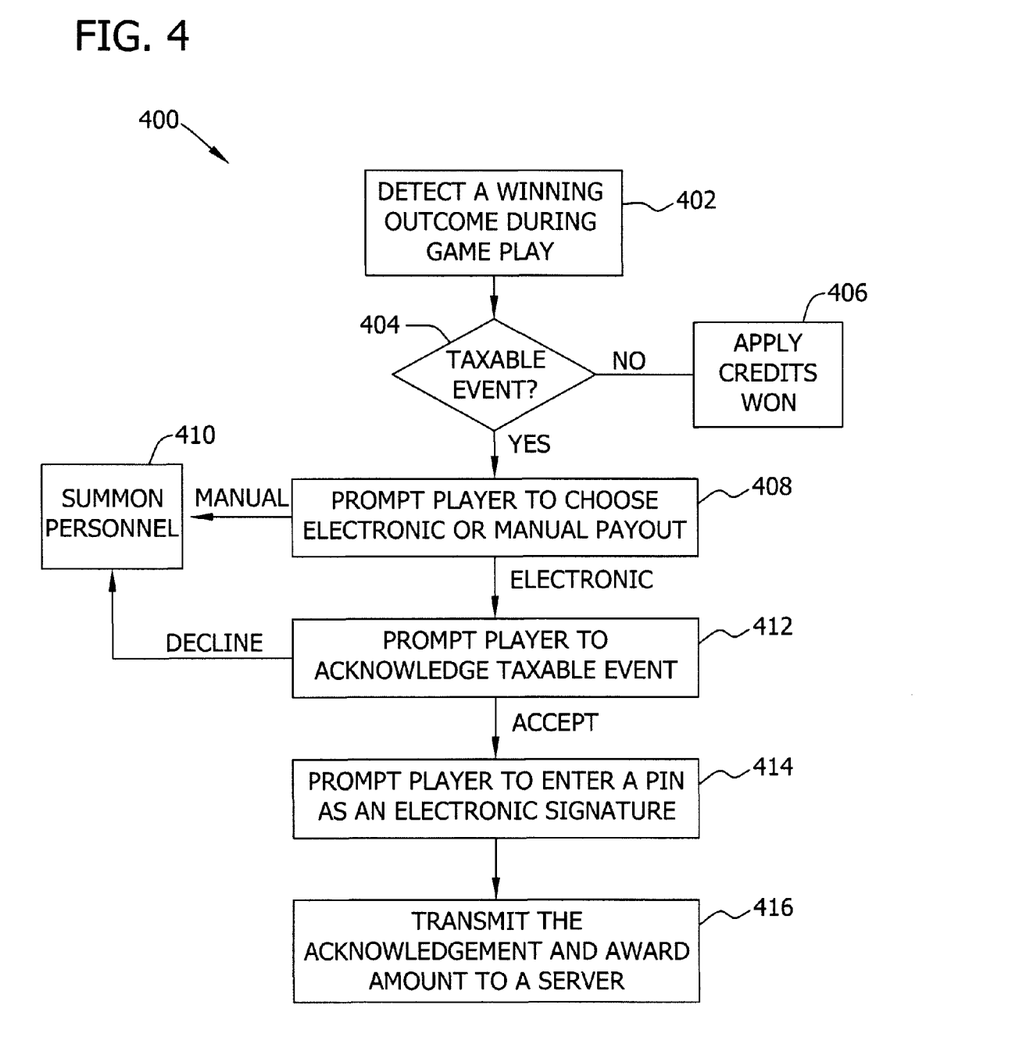
FIG. 4 is a flowchart that illustrates an exemplary method of game play using the gaming system shown in FIG. 2.
Figure 5:
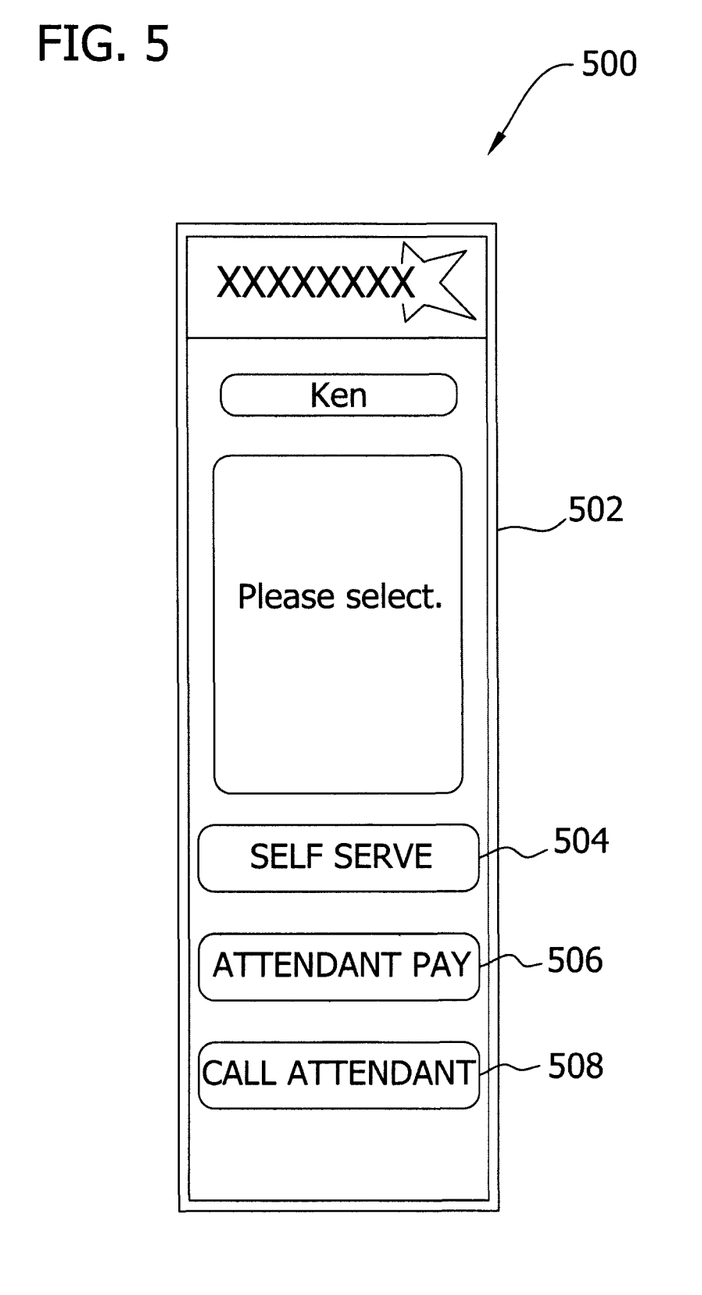
FIG. 5 is a view of an exemplary user interface for use in prompting a player to select a pay mode.

FIG. 4 is a flowchart 400 that illustrates an exemplary method of game play. In the exemplary embodiment, a winning outcome is detected 402 during play of a game by a player at gaming machine 100 (shown in FIG. 1). The winning outcome may either be detected by gaming machine 100 and/or by a server, such as gaming server 202 (shown in FIG. 2). If the winning outcome is determined by gaming machine 100, gaming machine 100 transmits a message that includes an amount won to a server, such as accounting server 204 (shown in FIGS. 2 and 3). The winning outcome is then analyzed to determine 404 whether a reportable event has occurred based on an associated award amount. A winning outcome is a reportable event if the award amount is equal to or greater than a threshold amount. If the award amount is less than the threshold amount, gaming machine 100 applies 406 a number of credits representative of the award amount to credit display 112 (shown in FIG. 1). If the winning outcome is a reportable event, gaming machine 100 locks, i.e., ceases to enable the player to continue playing and thus prevents further play until additional player action is taken. The player is prompted 408 to choose whether he would prefer electronic generation of the taxable accrual log and payout, or manual generation of the taxable accrual log and payout. FIG. 5 is a view of an exemplary user interface 500 that prompts the player for such an input. Specifically, user interface 500 includes a message area 502 that provides, for example, prompts to a player. As shown in FIG. 5, message area 502 prompts the player to choose electronic generation of the taxable accrual log via a self-serve button 504, or manual generation of the taxable accrual log via attendant pay button 506. For additional explanation of buttons 504 and 506, for example, the player may summon gaming establishment personnel via a call attendant button 508. In some embodiments, a server, such as accounting server 204 controls display of user interface 500. If the player chooses attendant pay button 506, then gaming establishment personnel are summoned 410 to record the award amount and player data, and to obtain the player's signature, for use in preparing the appropriate forms.

Figure 6:
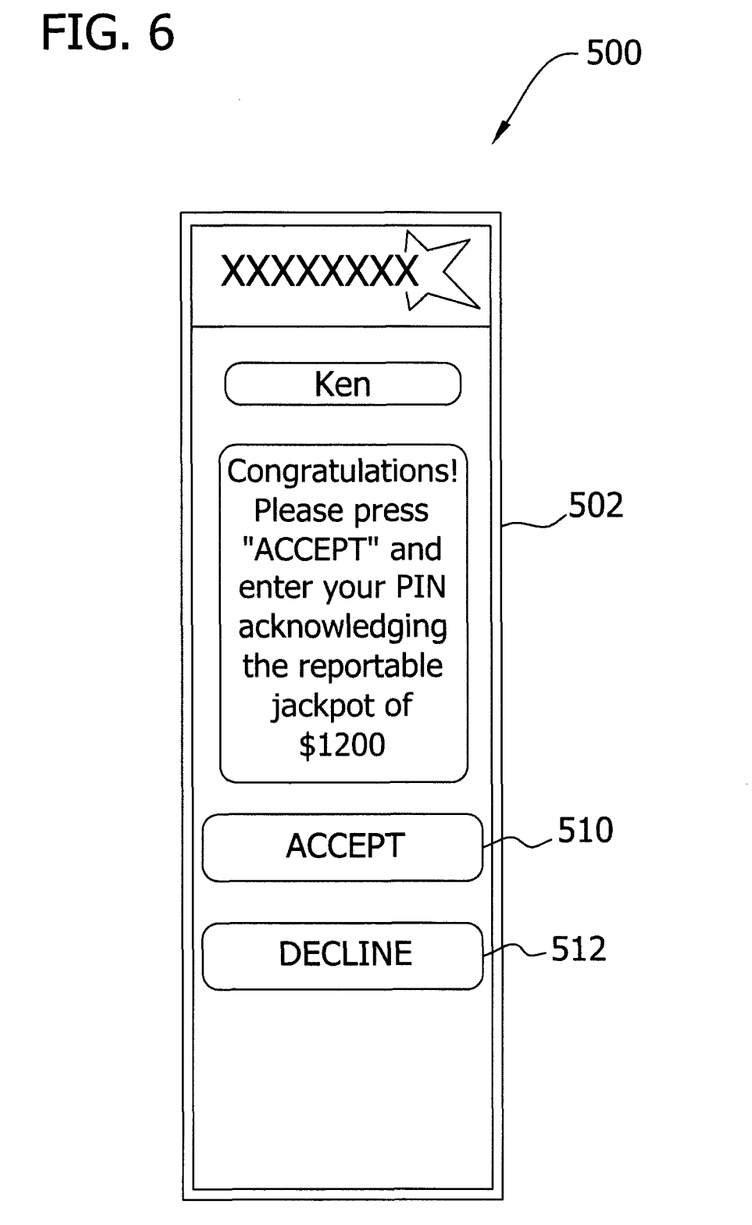
FIG. 6 is another view of the user interface shown in FIG. 5, adapted to prompt the player to acknowledge a reportable event.
Figure 7:
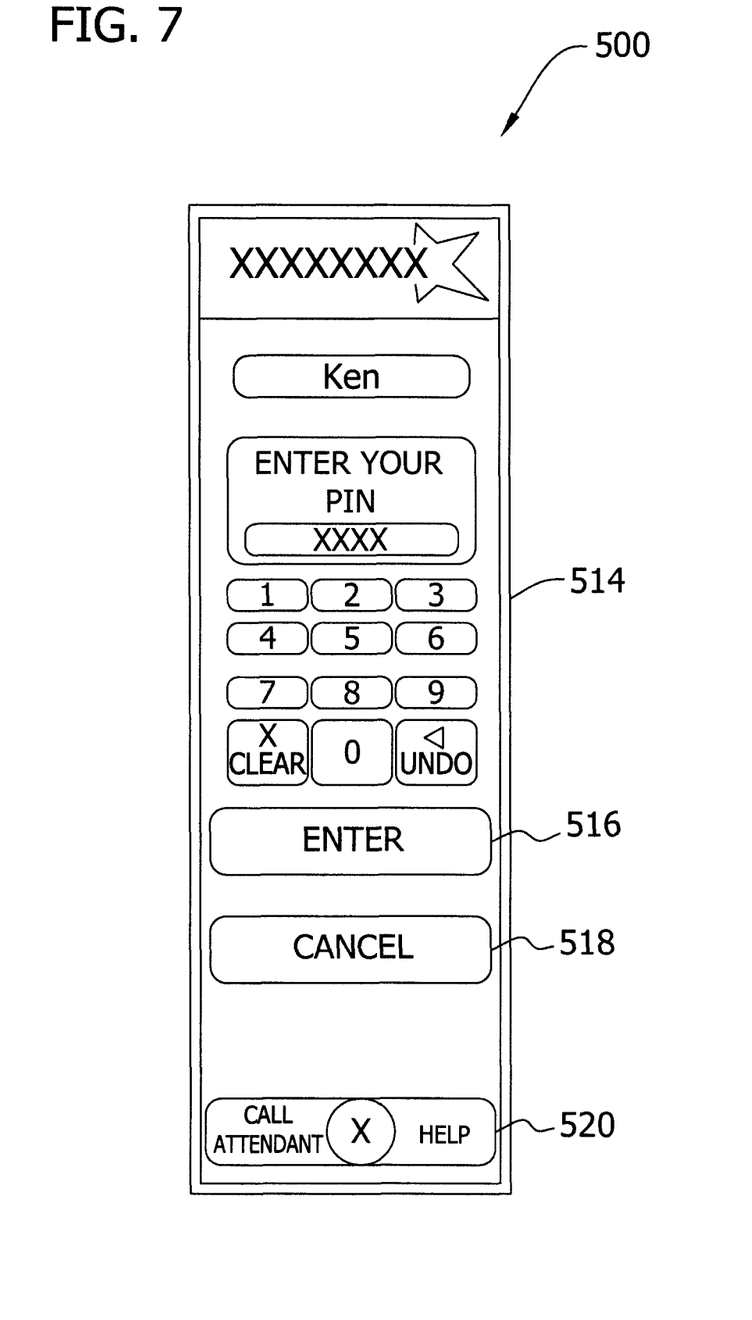
FIG. 7 is another view of the user interface shown in FIG. 5, adapted to prompt the player to enter a personal identification number for use as an electronic signature.

Referring again to FIG. 4, and if the player chooses self-serve button 504, then the player is prompted 412 to acknowledge that the winning outcome is a reportable event. FIG. 6 is a view of user interface 500 prompting the player for such an input. Specifically, as shown in FIG. 6, message area 502 provides prompts to a player to acknowledge that the winning outcome is a reportable event. User interface 500 also includes an accept button 510 and a decline button 512. In some embodiments, a server, such as accounting server 204 controls display of user interface 500. If the player chooses decline button 512, gaming establishment personnel are summoned 410 to record the award amount and player data, and to obtain the player's signature, for use in preparing the appropriate forms. Referring again to FIG. 4, and if the player chooses accept button 510, the player is prompted 414 to enter a personal identification number for use as an electronic signature that certifies the reportable event within the taxable accrual log stored in jackpot record database 312 (shown in FIG. 3). FIG. 7 is a view of user interface 500 prompting the player for such an input. Specifically, as shown in FIG. 7, user interface 500 includes a keypad 514 for entering a player identification number (PIN), an enter button 516, and a cancel button 518. User interface 500 also includes a help button 520 that calls gaming establishment personnel. Cancel button 518 clears any numbers entered via keypad 514 and/or locks user interface 500 and summons gaming establishment personnel. When the player enters a PIN and uses enter button 516, gaming machine 100 transmits 416 the acknowledgement and the award amount to accounting server 204 for storage in jackpot record database 312. Accounting server 204 then generates a tax accrual log. Moreover, gaming machine 100 is unlocked for further play. Providing player-drive, electronically-generated tax accrual logs enables additional game play by the player without frequent interruptions by gaming establishment personnel. Rather, the player may simply input simple commands and a PIN, which then unlocks gaming machine 100 for further play. In some embodiments, the player may need to give consent to electronically generate the tax accrual log, such as during registration with a player tracking and loyalty program of the gaming establishment.

In one embodiment, and referring again to FIG. 4, accounting server 204 further analyzes the winning outcome to apportion the award amount between cashable credits and non-cashable credits in order to mitigate the need to complete tax forms as described above. For example, accounting server 204 compares the award amount to a threshold amount that defines a reportable event. Accounting server 204 then divides the award amount into a first portion that includes cashable credits and a second portion that includes non-cashable credits. The first portion is less than the threshold amount that defines the reportable event, and the second portion is the remaining amount of the award. Accounting server 204 updates player data stored in player account database (shown in FIG. 3), and transmits the number of credits of each of the first and second portions to gaming machine 100. Gaming machine 100 then updates a number of cashable credits available for wagering or for cash-out via credit display 112. In addition, gaming machine 100 updates a number of non-cashable credits available for wagering. At the end of a gaming session, the player may choose to save the non-cashable credits for later use at the gaming establishment, or to reconcile with the gaming establishment by converting the non-cashable credits to cashable credits. Such a conversion includes generating appropriate tax forms as described above, either electronically or manually.

In an alternative embodiment, the player can configure a paytable used by gaming machine 100 and/or gaming server 202. For example, when playing gaming machine 100 using wagers that are likely to require generation of a taxable accrual log, the player may wish to avoid frequent stoppages in play to complete the operations described above. Prior to beginning game play on gaming machine 100, the player can designate a threshold amount that will trigger the method shown in FIG. 4. Any award amount less than the player's designated threshold amount will be awarded as non-cashable credits. Any award that is greater than the player's designated threshold amount will be processed as described above. For example, if the player sets a designated threshold amount to $3,000 and obtains a winning outcome having a $2,500 award amount, accounting server 204 awards the entire $2,500 award amount as non-cashable credit. If the player obtains a winning outcome having a $3,500 award amount, accounting server 206 awards $1,199 as cashable credits and $2,301 as non-cashable credits.

In an alternative embodiment, a game itself performs all or most of the above-described functions ascribed to gaming machine 100 and/or gaming system 200. For example, the game may include a hardcoded threshold for awarding cashable credits for use in comparing an award amount to the thresholds. Alternatively, the game may present the player with an option to enter the thresholds at the start of a gaming session. Moreover, the game may award cashable credits to the credit meter and non cashable to a non cashable meter. These meters could be components of gaming machine 100 or may be transferred to a central account to enable aggregation and transfer to and from other gaming machines 100.

Exemplary embodiments of systems, methods, and apparatus for mitigating frequent game play interruptions to complete required tax forms when winning outcomes have award amounts exceeding a threshold amount are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

As will be appreciated based on the foregoing specification, the above-described embodiments of the disclosure may be implemented using computer programming or engineering techniques including computer software, firmware, hardware or any combination or subset thereof, wherein the technical effect is decreasing a number of interruptions to game play to complete tax forms. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The term "processor," as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

A computer or controller, such as those described herein, includes at least one processor or processing unit and a system memory. The computer or controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment. Examples of well known gaming systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising a processor configured to communicate with a remote server, said processor further configured to:
   identify a registered player, said registered player being associated with taxable accrual log data;
   detect a reportable event during play of a game by the player, wherein the reportable event is associated with a winning outcome having an associated award amount;
   receive an acknowledgement of the reportable event from the player in response to detecting the reportable event;
   in response to detecting the reportable event, elicit a selection by the player of one of: (i) an electronic payout of the winning outcome which occurs independent of any gaming establishment personnel, and (ii) a manual payout of the winning outcome which occurs in association with gaming establishment personnel; and
   transmit the acknowledgement of the reportable event and the award amount to the remote server for use in generating, at least in part based on the taxable accrual log data associated with the player, a taxable accrual log.

2. The gaming machine of claim 1, wherein said processor is further configured to prompt the player to enable electronic generation of the taxable accrual log or to request manual generation of the taxable accrual log.

3. The gaming machine of claim 2, wherein said processor is further configured to:
   receive an input from the player that enables electronic generation of the taxable accrual log; and
   prompt the player to acknowledge the reportable event.

4. The gaming machine of claim 1, wherein said processor is further configured to prompt the player to enter a personal identification number for use as an electronic signature that certifies the reportable event within the taxable accrual log.

5. The gaming machine of claim 1, further including a display device coupled to said processor, said processor further configured to cause said display device to display a first portion of the award amount via a first credit meter of the gaming machine as cashable credits, wherein the first portion of the award amount is less than a threshold amount defined by the reportable event.

6. The gaming machine of claim 5, wherein said processor is further configured to display a second portion of the award amount via the credit meter as non-cashable credits.

7. The gaming machine of claim 5, wherein said processor is further configured to reconfigure a paytable of the gaming machine to redefine the threshold amount.

8. A computerized method comprising:
   identifying a registered player, said registered player being associated with taxable accrual log data;
   detecting a winning outcome during play of a game by the player at a gaming machine;
   determining whether the winning outcome is a reportable event based on an award amount associated with the winning outcome;
   receiving an acknowledgement from the player of the reportable event in response to determining that the winning outcome is a reportable event; and
   enabling the player to select one of: (i) an electronic generation of a taxable accrual log which occurs independent of any gaming establishment personnel, and (ii) a manual generation of the taxable accrual log which occurs in association with gaming establishment personnel; and
   if the player selects the electronic generation of the taxable accrual log, transmitting the amount won to a remote server for use in electronically generating, at least in part based on the taxable accrual log data associated with the player, the taxable accrual log.

9. The computerized method of claim 8, further including receiving consent from the player to electronically generate the taxable accrual log.

10. The computerized method of claim 8, further including:
    receiving an input from the player that enables electronic generation of the taxable accrual log; and
    prompting the player to acknowledge the reportable event.

11. The computerized method of claim 8, further including prompting the player to enter a personal identification number for use as an electronic signature that certifies the reportable event within the taxable accrual log.

12. The computerized method of claim 8, further including transferring a first portion of the award amount to a credit meter of the gaming machine as cashable credits, wherein the first portion of the award amount is less than a threshold amount defined by the reportable event.

13. The computerized method of claim 12, further including transferring a second portion of the award amount to the credit meter as non-cashable credits.

14. The computerized method of claim 12, further including reconfiguring a paytable of the gaming machine to redefine the threshold amount.

15. A gaming system comprising:
   a gaming machine; and
   a server coupled to said gaming machine via a network, said server configured to:
      identify a registered player, said registered player being associated with taxable accrual log data;
      detect a winning outcome during a play of a game by the player;
      determine whether the winning outcome is a reportable event;
      receive a payment method selection by the player from said gaming machine in response to determining that the winning outcome is a reportable event, wherein the payment method selection is one of: (i) an electronic payment option which occurs independent of any gaming establishment personnel, and (ii) a manual payment option which occurs in association with gaming establishment personnel; and
      when the payment method selection is the electronic payment option:
         (i) record a first portion of an award amount of the winning outcome in a player account associated with the player, and
         (ii) record a second portion of the award amount in the player account, wherein the first portion includes cashable credits that are worth less than a threshold amount that defines the reportable event and the second portion includes non-cashable credits.

16. The gaming system of claim 15, wherein server is further configured to cause said gaming machine to display a prompt to the player to enable electronic generation of a taxable accrual log or to request manual generation of the taxable accrual log.

17. The gaming system of claim 15, wherein said server is further configured to:
   receive an input from the player that enables electronic generation of a taxable accrual log that includes data relating to the reportable event; and
   cause said gaming machine to display a prompt to the player to acknowledge the reportable event.

18. The gaming system of claim 17, wherein said server is further configured to cause said gaming machine to display a prompt to the player to enter a personal identification number for use as an electronic signature that certifies the reportable event within the taxable accrual log.

19. The gaming system of claim 17, further including a memory area coupled to said server, wherein said server is further configured to record an acknowledgement of the reportable event by the player and the award amount in said memory area.

20. The gaming system of claim 15, wherein the threshold amount is defined by a paytable, said server is further configured to reconfigure the paytable to determine a number of cashable credits in the first portion of the award amount and a number of non-cashable credits in the second portion of the award amount.

21. The gaming machine of claim 1, wherein transmitting the acknowledgement of the reportable event and the award amount to the remote server for use in generating a taxable accrual log includes storing the award amount in a jackpot record database.

* * * * *

UNITED STATES PATENT AND TRADEMARK OFFICE
CERTIFICATE OF CORRECTION

PATENT NO. : 8,753,194 B2
APPLICATION NO. : 12/944261
DATED : June 17, 2014
INVENTOR(S) : Richard Jay Schneider et al.

It is certified that error appears in the above-identified patent and that said Letters Patent is hereby corrected as shown below:

IN THE CLAIMS

In Claim 8, Column 14, Line 47, between "the" and "amount" insert --award--.
In Claim 16, Column 16, Line 1, between "wherein" and "server" insert --the--.
In Claim 21, Column 16, Line 31, replace "a" with --the--.

Signed and Sealed this
Twenty-sixth Day of May, 2015

Michelle K. Lee
*Director of the United States Patent and Trademark Office*